United States Patent
Yamada

(10) Patent No.: US 10,960,720 B2
(45) Date of Patent: Mar. 30, 2021

(54) CONNECTING STRUCTURE FOR ARTICULATED VEHICLE

(71) Applicant: SENYO KOGYO CO., LTD., Osaka (JP)

(72) Inventor: Yusaku Yamada, Osaka (JP)

(73) Assignee: SENYO KOGYO CO., LTD., Osaka (JP)

( * ) Notice: Subject to any disclaimer, the term of this patent is extended or adjusted under 35 U.S.C. 154(b) by 264 days.

(21) Appl. No.: 16/082,869

(22) PCT Filed: Mar. 10, 2016

(86) PCT No.: PCT/JP2016/001314
§ 371 (c)(1),
(2) Date: Sep. 6, 2018

(87) PCT Pub. No.: WO2017/154041
PCT Pub. Date: Sep. 14, 2017

(65) Prior Publication Data
US 2020/0298640 A1 Sep. 24, 2020

(51) Int. Cl.
*B60D 1/32* (2006.01)
*B60D 1/24* (2006.01)
*B61G 7/14* (2006.01)

(52) U.S. Cl.
CPC ............. *B60D 1/327* (2013.01); *B60D 1/24* (2013.01); *B61G 7/14* (2013.01)

(58) Field of Classification Search
CPC ............. B60D 1/32; B60D 1/327; B60D 1/34
See application file for complete search history.

(56) References Cited

U.S. PATENT DOCUMENTS

| 2,612,382 | A | * | 9/1952 | Landis | ............ B60D 1/32 280/456.1 |
| 3,305,246 | A | * | 2/1967 | Gonczy | ............ B60D 1/30 280/455.1 |

(Continued)

FOREIGN PATENT DOCUMENTS

| CN | 1226212 A | 8/1999 |
| CN | 102918206 A | 2/2006 |

(Continued)

OTHER PUBLICATIONS

International Search Report for the Application No. PCT/JP2016/001314 dated May 10, 2016.

*Primary Examiner* — Kevin Hurley
(74) *Attorney, Agent, or Firm* — Cheng Law Group, PLLC

(57) ABSTRACT

A connecting structure for an articulated vehicle includes a first vehicle and a second vehicle connected via a coupler along a travelling direction of the articulated vehicle. The structure includes: a pair of anchors disposed at an end of the first vehicle so as to be on both sides of the coupler in a direction perpendicular to the travelling direction in plan view, the end facing the second vehicle; a pair of supports disposed at an end of the second vehicle so as to be on both sides of the coupler in the direction perpendicular to the travelling direction in plan view, the end facing the first vehicle; and a connecting cord having both ends connected to the anchors with an intermediate portion of the connecting cord being supported by the supports. The supports support the connecting cord in a manner allowing for movement of the connecting cord.

7 Claims, 13 Drawing Sheets

(56) References Cited

U.S. PATENT DOCUMENTS

| | | | | |
|---|---|---|---|---|
| 3,338,595 A | * | 8/1967 | Bogie | B60D 1/32 |
| | | | | 280/455.1 |
| 3,362,727 A | * | 1/1968 | Malherbe | B60D 1/345 |
| | | | | 280/455.1 |
| 3,394,949 A | * | 7/1968 | Gearhart | B62D 53/0871 |
| | | | | 280/455.1 |
| 3,659,874 A | * | 5/1972 | Rendessy | B60D 1/28 |
| | | | | 280/455.1 |
| 3,837,676 A | * | 9/1974 | Rendessy | B60D 1/32 |
| | | | | 280/455.1 |
| 3,871,686 A | * | 3/1975 | Rendessy | B60D 1/32 |
| | | | | 280/455.1 |
| 4,575,110 A | * | 3/1986 | Kuhn | B60D 1/173 |
| | | | | 280/446.1 |
| 5,016,899 A | * | 5/1991 | Euteneier | B60D 1/32 |
| | | | | 280/446.1 |
| 5,407,220 A | * | 4/1995 | Fischer | B60D 1/30 |
| | | | | 280/446.1 |
| 5,953,997 A | | 9/1999 | Andre et al. | |
| 6,000,708 A | | 12/1999 | Harp et al. | |
| 7,540,523 B2 | * | 6/2009 | Russell | B60D 1/30 |
| | | | | 280/430 |
| 2013/0121761 A1 | | 5/2013 | Dixon | |

FOREIGN PATENT DOCUMENTS

| | | |
|---|---|---|
| CN | 202541561 U | 11/2012 |
| JP | 58-171768 U | 11/1983 |
| JP | 2001-1893 A | 1/2001 |
| JP | 2004-42715 A | 2/2004 |
| JP | 2005-253659 A | 9/2005 |
| JP | 2007-246001 A | 9/2007 |
| KR | 1989-0001183 B1 | 4/1989 |

* cited by examiner

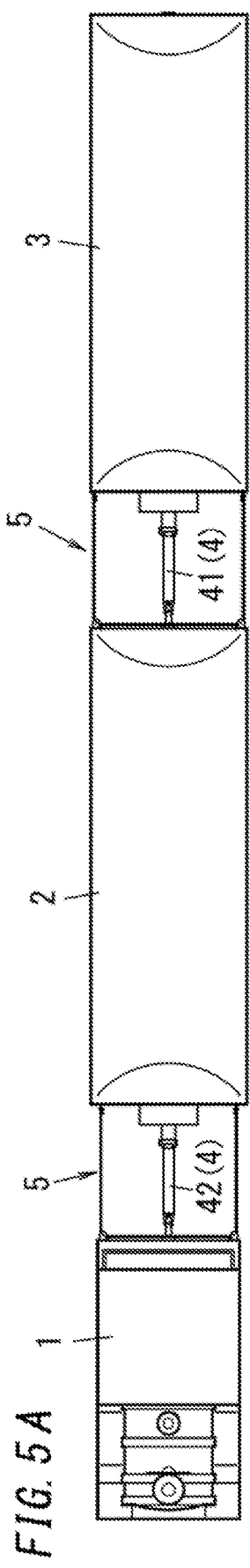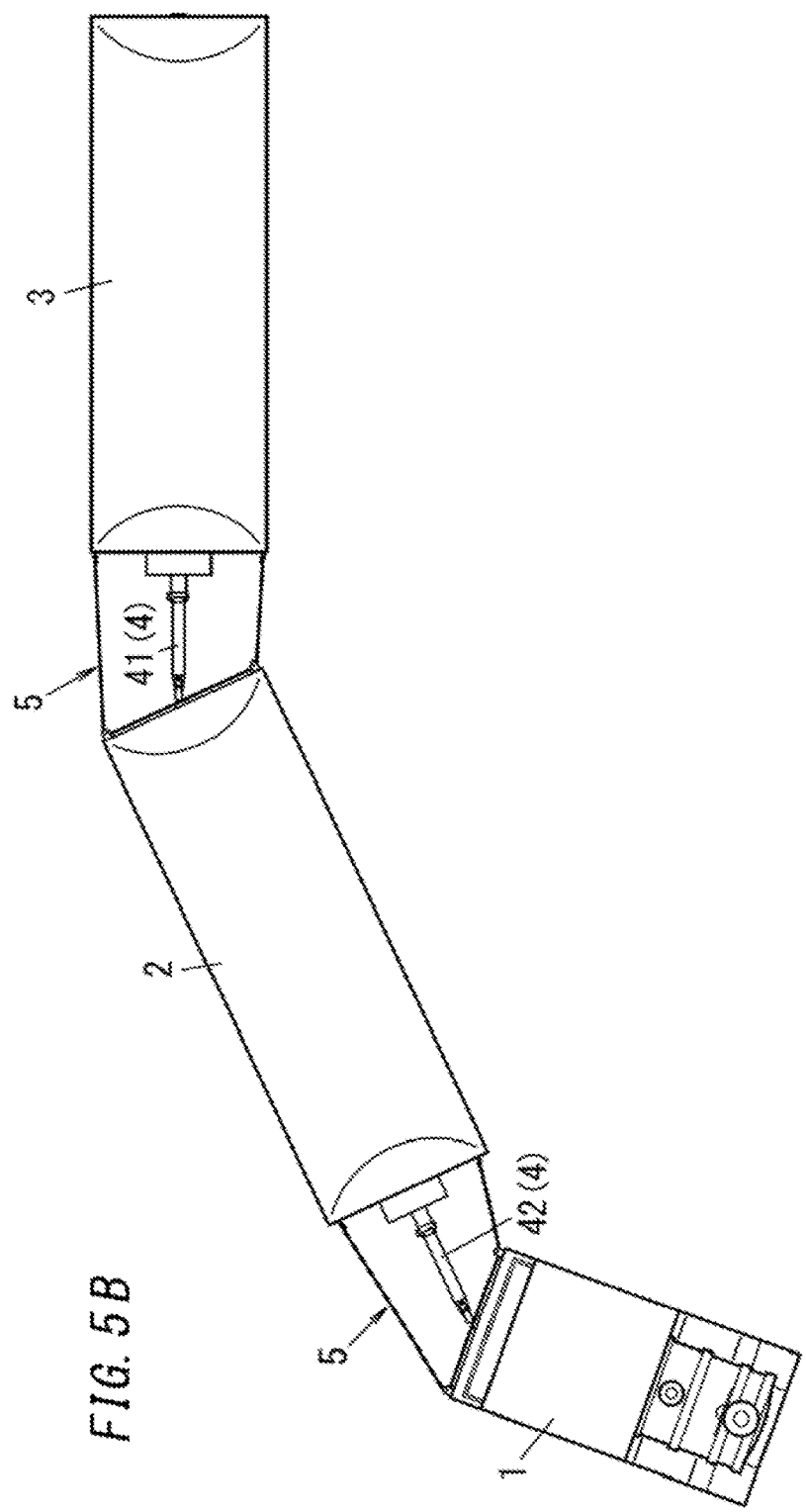

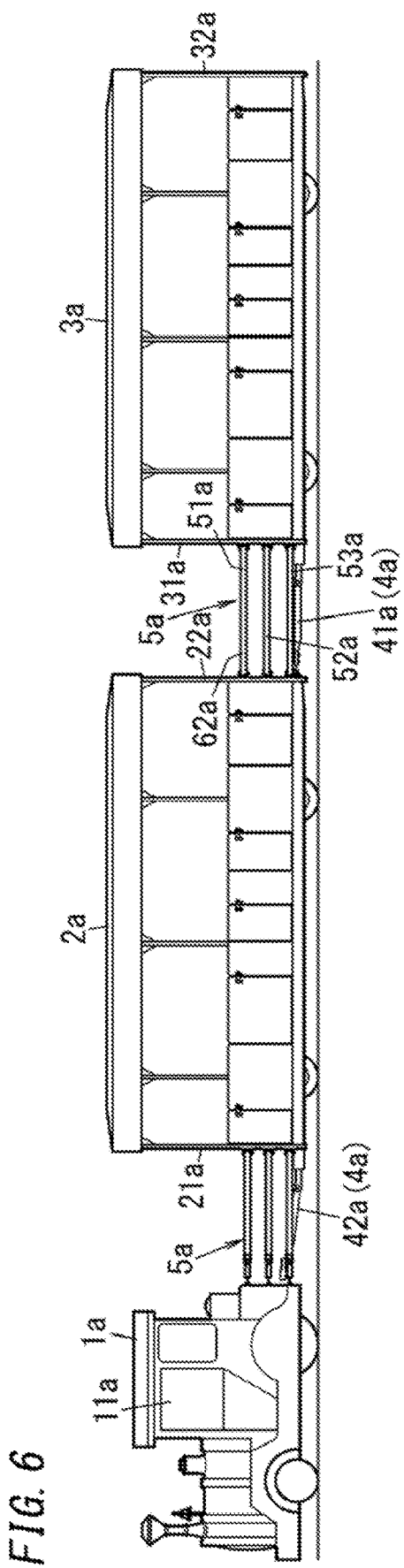

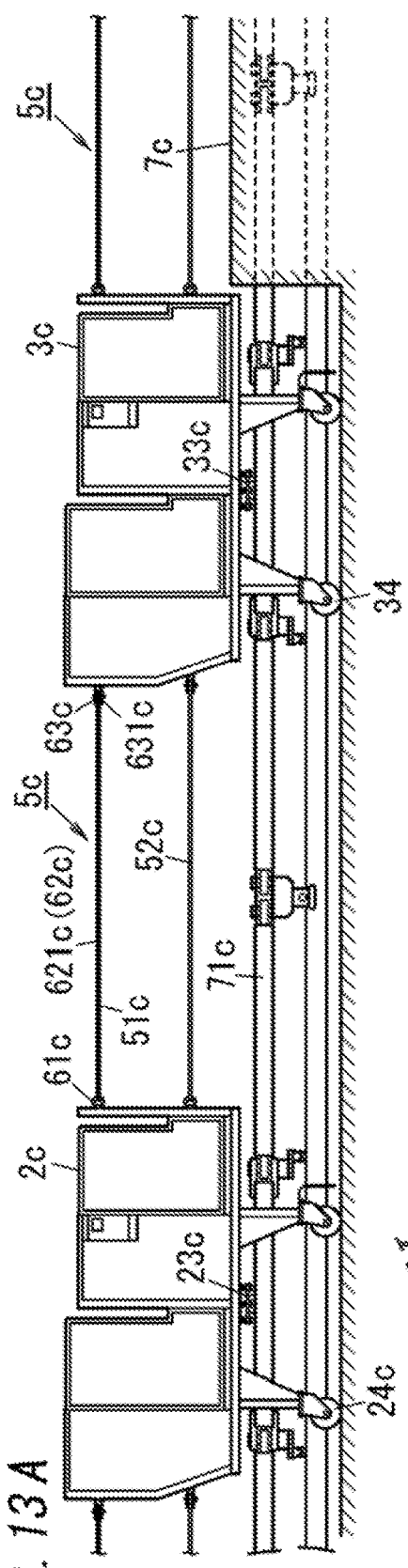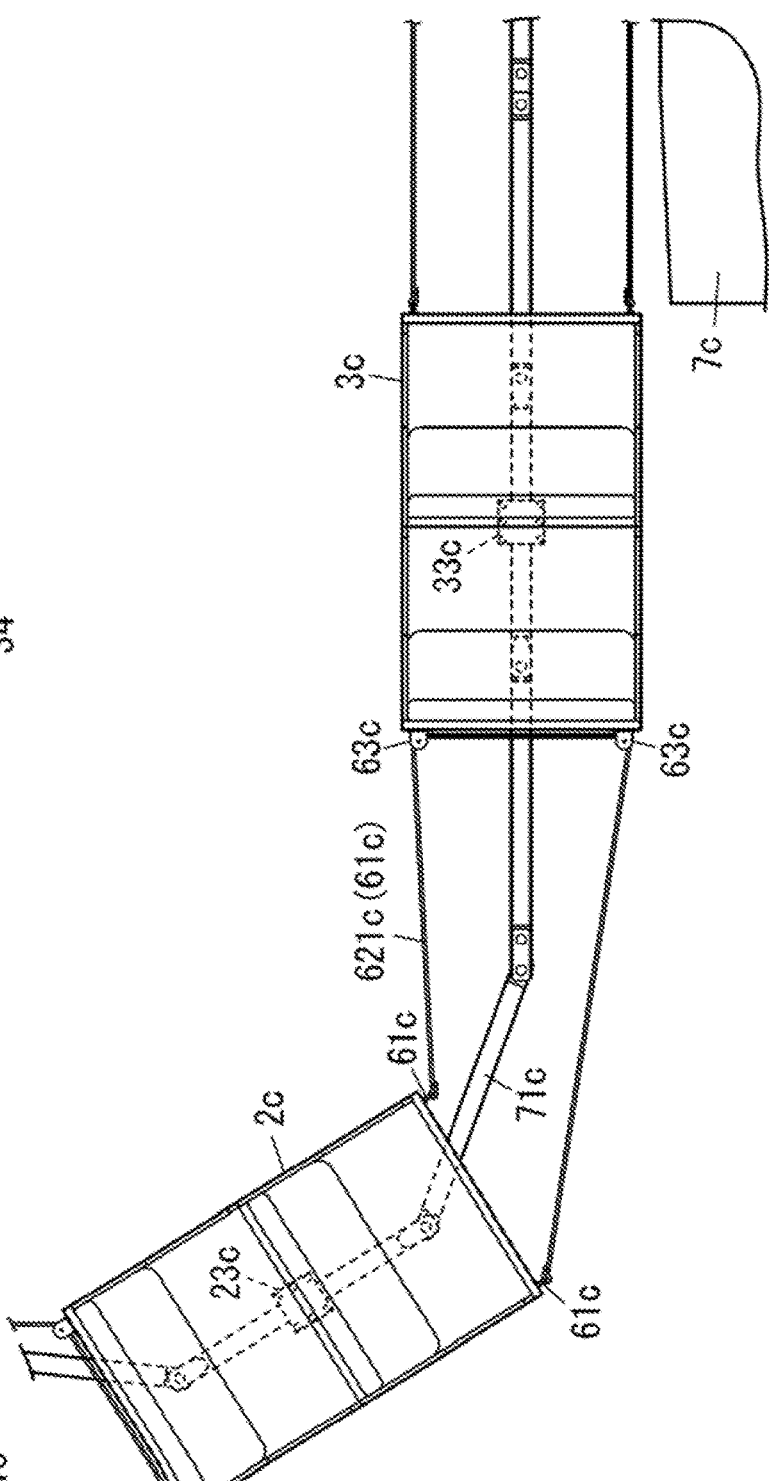

CONNECTING STRUCTURE FOR ARTICULATED VEHICLE

TECHNICAL FIELD

The present invention relates to a connecting structure for an articulated vehicle.

BACKGROUND ART

JP 2005-253659 A (hereinafter, referred to as Document 1) discloses a conventional connecting structure for a vehicle. The vehicle described in Document 1 is a connection type sightseeing automobile including front and rear vehicles connected to each other via a connecting rod. The connection type sightseeing automobile includes belts for approach prevention provided on both left and right ends of the connection rod (both sides in a direction perpendicular to a travelling direction) to prevent a person from approaching a space between the front vehicle and the rear vehicle. Each belt for approach prevention has one end attached to a belt winding device so as to be freely drawn and the other end to which a connecting plate is attached.

The belt winding device is configured to continuously urge the belt for approach prevention in a wind-up direction. The belt winding device is attached to, for example, a rear wall of the front vehicle. Moreover, a buckle body is attached to a front wall of the rear vehicle. The belt for approach prevention is drawn from the belt winding device, and the connecting plate is freely detachably attached to the buckle body, thereby disposing the belt for approach prevention along the connection rod.

When the connection type sightseeing automobile turns, for example, left, a left-side gap between the front vehicle and the rear vehicle narrows, and a right-side gap between the front vehicle and the rear vehicle widens when viewed in a travelling direction of the front vehicle and the rear vehicle. However, the drawn length of the belt for approach prevention changes depending on the size of the gap, and therefore, warping and drooping down of the belt for approach prevention are prevented also when the connection type sightseeing automobile travels straightly or turns to left or right.

In the conventional vehicle, however, a stopper acts when the belt for approach prevention is abruptly drawn, but the stopper does not act when the belt for approach prevention is slowly drawn. Thus, in the conventional vehicle, a deterrent to entry virtually acts, but entry of a person may not be prevented by mechanical action.

SUMMARY OF INVENTION

One of the objectives of the present disclosure is to provide a connecting structure for an articulated vehicle including a plurality of vehicles connected to each other, wherein the connecting structure enables mechanical action to prevent a person from entering a coupler while warping and drooping down of a connecting cord is reduced when the articulated vehicle turns left or right.

A connecting structure for an articulated vehicle of a first aspect of the present invention is a connecting structure for an articulated vehicle including a first vehicle and a second vehicle connected to each other via a coupler along a travelling direction of the articulated vehicle. The connecting structure includes a pair of anchors, a connecting cord, and a pair of supports. The pair of anchors is disposed at an end of the first vehicle so as to be on both sides of the coupler in a direction perpendicular to the travelling direction in plan view, the end facing the second vehicle. The pair of supports is disposed at an end of the second vehicle so as to be on both sides of the coupler in the direction perpendicular to the travelling direction in plan view, the end facing the first vehicle. The connecting cord has both ends connected to the pair of anchors with an intermediate portion of the connecting cord being supported by the pair of supports. The pair of supports supports the connecting cord in a manner allowing for movement of the connecting cord.

In a connecting structure for an articulated vehicle of a second aspect referring to the connecting structure for the articulated vehicle of the first aspect, each of the pair of supports includes a pulley which supports the connecting cord.

In a connecting structure for an articulated vehicle of a third aspect referring to the connecting structure for the articulated vehicle of the second aspect, the connecting cord includes a belt. The pulley has a diameter which decreases toward a center side in a rotation-axis direction.

A connecting structure for an articulated vehicle of a fourth aspect referring to the connecting structure for the articulated vehicle of any one of the first to third aspects includes a plurality of entry preventive bodies each including the pair of anchors, the connecting cord, and the pair of support constitutes an entry preventive body, wherein the plurality of entry preventive bodies are disposed in a vertical direction.

In a connecting structure for an articulated vehicle of a fifth aspect referring to the connecting structure for the articulated vehicle of the fourth aspect, the pair of anchors and the pair of supports included in at least one entry preventive body of the plurality of entry preventive bodies are disposed with an offset from each other in the vertical direction.

A connecting structure for an articulated vehicle of a sixth aspect referring to the connecting structure for the articulated vehicle according to any one of the first to fifth aspects further includes a tension imparting unit configured to impart tension to the connecting cord.

In a connecting structure for an articulated vehicle of a seventh aspect referring to the connecting structure for the articulated vehicle according to the sixth aspect, the tension imparting unit includes a pair of springs disposed on both ends in a longitudinal direction of the connecting cord.

A connecting structure for an articulated vehicle of an eighth aspect referring to the connecting structure for the articulated vehicle according to the seventh aspect includes: a pair of first supports as the pair of supports; and a pair of second supports disposed at the end of the first vehicle which faces the second vehicle. Each of the pair of second supports is apart from a corresponding one of the pair of anchors. The connecting cord is supported by the pair of second supports and the pair of first supports. Each of the pair of springs is disposed between a corresponding one of the pair of second supports and a corresponding one of the pair of anchors.

BRIEF DESCRIPTION OF DRAWINGS

FIG. 5A is a plan view illustrating a state where the articulated vehicle travels straightly, and FIG. 5B is a plan view illustrating a state where the articulated vehicle turns left;

FIG. 6 is a side view illustrating an articulated vehicle of a first variation of the first embodiment of the present invention;

FIG. 13A is a side view illustrating a first passenger carriage and a second passenger carriage of the articulated vehicle of the second embodiment, and FIG. 13B is a plan view illustrating the first passenger carriage and the second passenger carriage of the articulated vehicle of the second embodiment.

DESCRIPTION OF EMBODIMENTS

Figure 1:
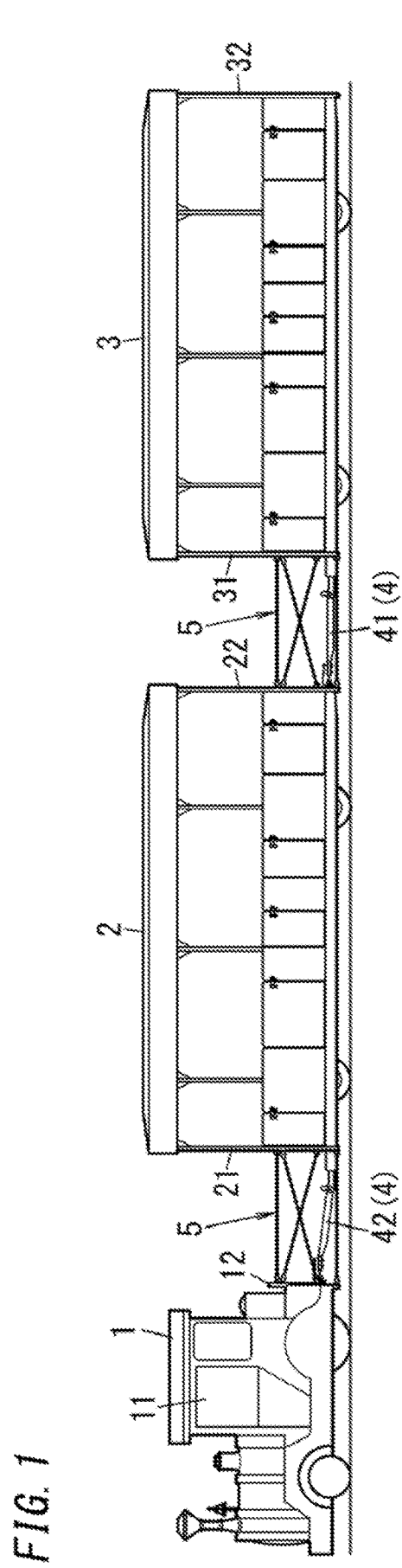
FIG. 1 is a side view illustrating an articulated vehicle of a first embodiment of the present invention.

The present invention relates to connecting structures of articulated vehicles, and specifically, to a connecting structure for an articulated vehicle, the connecting structure preventing a person from entering a space between vehicles of the articulated vehicle. Embodiments of the present invention will be described below with reference to the drawings.

First Embodiment

An articulated vehicle of a first embodiment is an automobile on which passengers ride for sightseeing in theme parks, for example, amusement parks. The articulated vehicle includes a tractor 1, a first passenger carriage 2, a second passenger carriage 3, a plurality of couplers 4, and a plurality of bar-like members 5. The tractor 1 and the first passenger carriage 2 are connected to each other via the coupler 4 along a travelling direction. The first passenger carriage 2 and the second passenger carriage 3 are connected to each other via the coupler 4 along the travelling direction. In the articulated vehicle, the tractor 1, the first passenger carriage 2, and the second passenger carriage 3 are aligned in this order.

In the following description, a direction along the travelling direction may be defined as a forward orientation, a direction opposite to the forward orientation may be defined as a rearward orientation, and a direction parallel to the travelling direction may be referred to as a forward-and-rearward direction. Moreover, a direction along a horizontal surface and toward a left side as viewed looking forward may be defined as a leftward orientation, a direction along the horizontal surface and toward a right side as viewed looking forward may be defined as a rightward orientation, and a direction parallel to the leftward orientation and the rightward orientation may be referred to as a right-and-left direction.

The tractor 1 pulls the first passenger carriage 2 and the second passenger carriage 3. The tractor 1 includes a driving unit and a driving room 11. The driving unit is configured to drive the tractor 1 and includes, for example, a gasoline engine or an electric motor. The driving room 11 is a cabin which a driver of the articulated vehicle enters, and the cabin is provided with a handle, an accelerator, a brake, and the like required for operation of the articulated vehicle. Moreover, the tractor 1 includes a rear wall 12. The rear wall 12 is a rear end of the tractor 1. A rear surface of the rear wall 12 is a vertical plane.

The first passenger carriage 2 is disposed behind the tractor 1. The first passenger carriage 2 is connected to the tractor 1 via the coupler 4. A plurality of seats are installed in the first passenger carriage 2, and a plurality of passengers are allowed to be on the plurality of seats. The first passenger carriage 2 includes a front end provided with a front wall 21 and a rear end provided with a rear wall 22. A front surface of the front wall 21 and a rear surface of the rear wall 22 are both vertical planes.

The second passenger carriage 3 is disposed behind the first passenger carriage 2. The second passenger carriage 3 is connected to the first passenger carriage 2 via the coupler 4. Similarly to the first passenger carriage 2, the second passenger carriage 3 includes a front wall 31 and a rear wall 32. Note that since the second passenger carriage 3 has the same structure as the first passenger carriage 2, redundant description will be omitted.

Each of the plurality of couplers 4 connects vehicles aligned in the forward-and-rearward direction to each other. As the plurality of couplers 4, the articulated vehicle of the present embodiment includes a first coupler 41 connecting the first passenger carriage 2 and the second passenger carriage 3 to each other and a second coupler 42 connecting the tractor 1 and the first passenger carriage 2 to each other. Here, since the first coupler 41 has the same structure as the second coupler 42, the first coupler 41 is mainly described.

Figure 2:
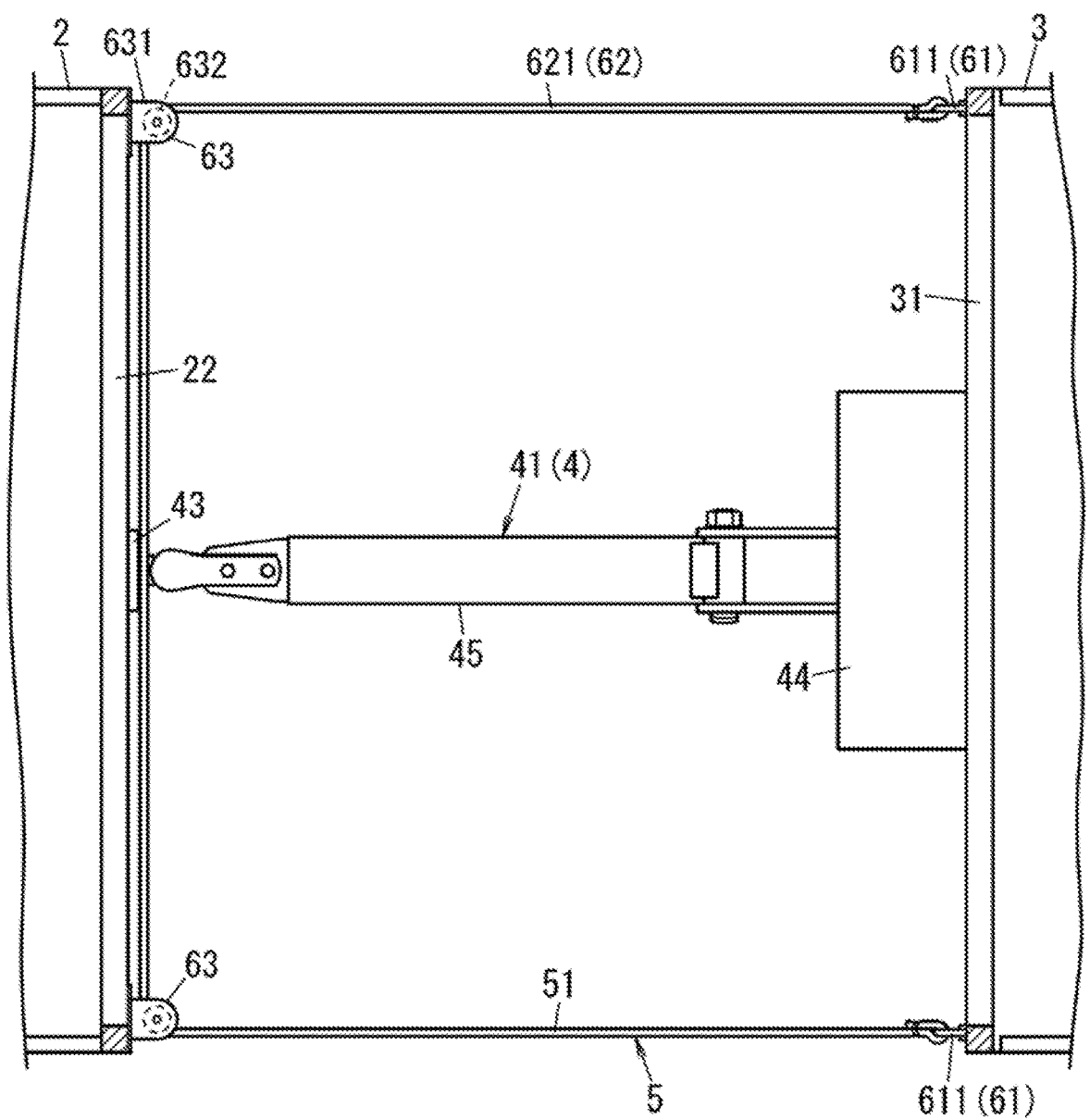
FIG. 2 is a plan view illustrating a part between a first passenger carriage and a second passenger carriage of the articulated vehicle.

The first coupler 41 is installed between the rear wall 22 of the first passenger carriage 2 and the front wall 31 of the second passenger carriage 3. As illustrated in FIG. 2, the first coupler 41 extends in the forward-and-rearward direction and is disposed at the center in the right-and-left direction when viewed from above (hereinafter, in plan view). The first coupler 41 includes a first anchor 43 fixed to the rear wall 22 of the first passenger carriage 2, a second anchor 44 fixed to the front wall 31 of the second passenger carriage 3, and a body section 45 connecting the first anchor 43 and the second anchor 44 to each other. The body section 45 is attached to the first anchor 43 pivotably in the right-and-left direction. Moreover, the body section 45 is attached to the second anchor 44 pivotably in the vertical direction. Thus, the second passenger carriage 3 can follow the first passenger carriage 2 also when the tractor 1 runs on a road with gradient or turns left or left.

The plurality of bar-like members 5 prevent a person from entering a space between vehicles. As illustrated in FIG. 1, the plurality of bar-like members 5 are provided individually between the tractor 1 and the first passenger carriage 2 and between the first passenger carriage 2 and the second passenger carriage 3. Each bar-like member 5 includes a plurality of entry preventive bodies 51 to 54 (FIG. 3)

surrounding the coupler 4 in plan view. Since the plurality of bar-like members 5 have the same structures, the bar-like member 5 disposed between the first passenger carriage 2 and the second passenger carriage 3 will be described below.

Figure 3:
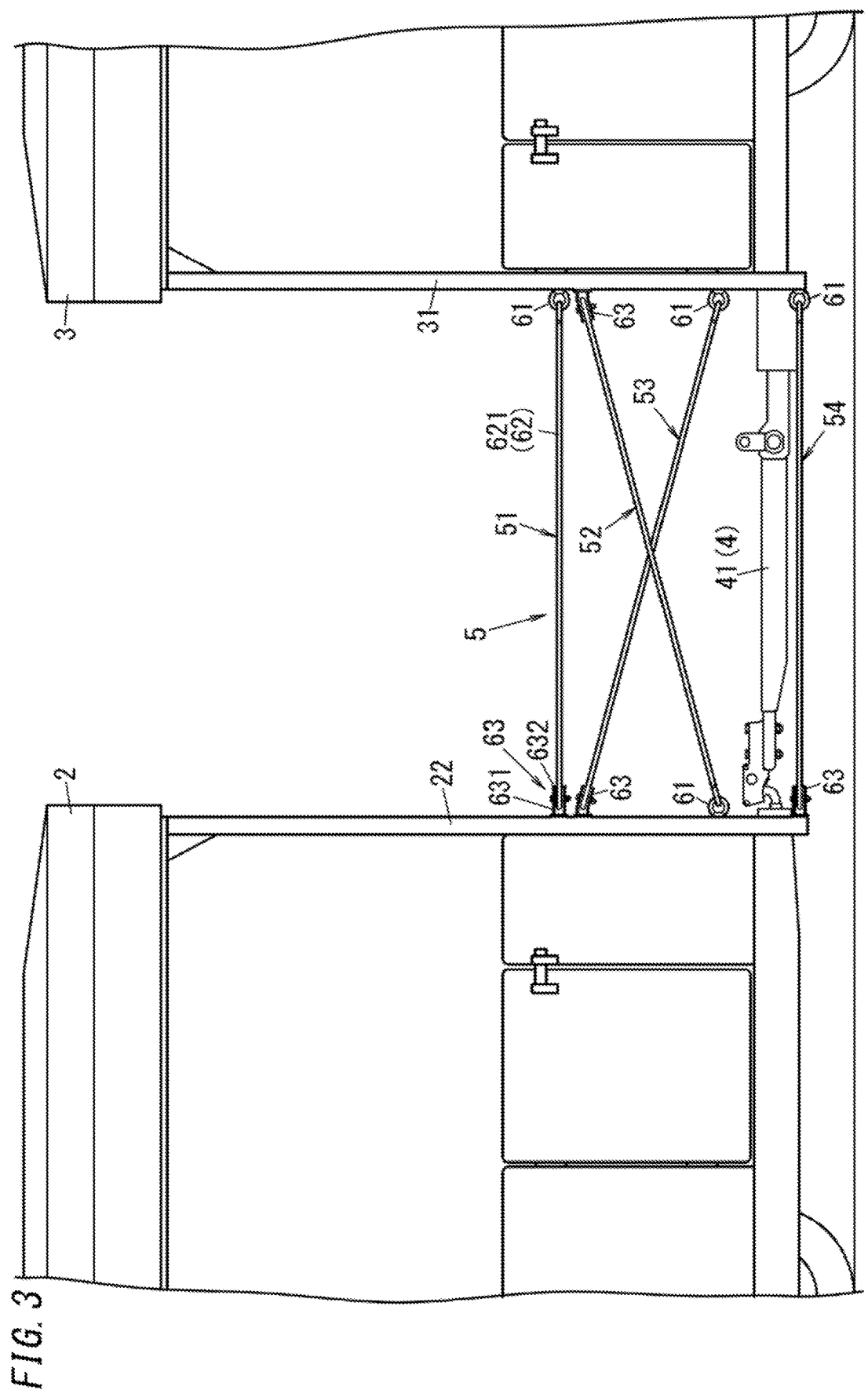
FIG. 3 is a side view illustrating the part between the first passenger carriage and the second passenger carriage.

As illustrated in FIG. 3, the plurality of entry preventive bodies are aligned in the vertical direction. As the plurality of entry preventive bodies 51 to 54, each bar-like member 5 of the present embodiment includes a first entry preventive body 51, a second entry preventive body 52, a third entry preventive body 53, and a fourth entry preventive body 54.

Figure 4:
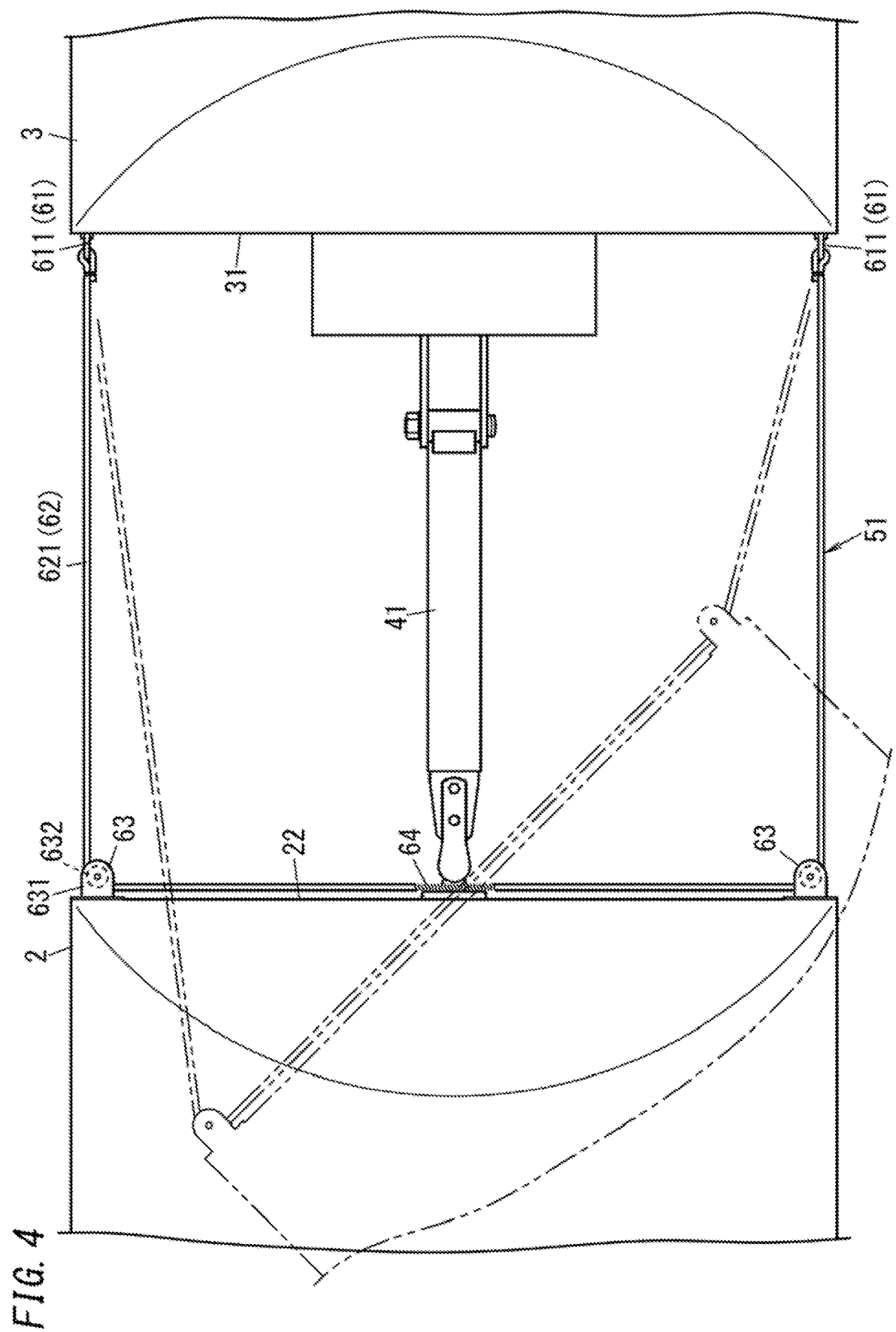
FIG. 4 is a plan view illustrating the part between the first passenger carriage and the second passenger carriage, wherein a state where the articulated vehicle turns left is shown by an imaginary line.

First, the first entry preventive body 51 will be described. FIG. 4 is a view illustrating the first entry preventive body 51 when viewed from above. As illustrated in FIG. 4, the first entry preventive body 51 includes a pair of anchors 61, a connecting cord 62, and a pair of supports 63.

The pair of anchors 61 fixes both ends of the connecting cord 62 on a one-to-one basis. The pair of anchors 61 is fixed to the front wall 31 of the second passenger carriage 3 to be apart from each other in the right-and-left direction, and thereby, the pair of anchors 61 is disposed on both sides of the first coupler 41 in the right-and-left direction. Specifically, each anchor 61 is fixed to a corresponding one of ends in the right-and-left direction of the front wall 31 of the second passenger carriage 3. Moreover, the pair of anchors 61 is located at the same level in the vertical direction (that is, the same height locations). Each anchor 61 of the present embodiment is, for example, an eyebolt 611.

The connecting cord 62 is a rope, a belt, or the like and has flexibility. The connecting cord 62 of the present embodiment is a rope 621. The rope 621 has both ends connected to the pair of anchors 61 on a one-to-one basis. The rope 621 is made of a non-stretchable material which does not stretch at a tension lower than or equal to a certain value.

The pair of supports 63 is fixed to the rear wall 22 of the first passenger carriage 2 to be apart from each other in the right-and-left direction, and thereby, the pair of supports 63 is disposed on both sides of the first coupler 41 in the right-and-left direction. Specifically, each support 63 is connected to a corresponding one of ends in the right-and-left direction of the rear wall 22 of the first passenger carriage 2. Moreover, the pair of supports 63 is located at the same level in the vertical direction and is at the same level as the pair of anchors 61 in the vertical direction (see FIG. 3). The pair of supports 63 is configured to support the rope 621 in a tensioned state with the both ends of the rope 621 being fixed to the pair of anchors 61. Moreover, the pair of supports 63 supports the rope 621 in a manner allowing for movement of the rope 621 with respect to each support 63. Each support 63 of the present embodiment includes a bracket 631 and a pulley 632 freely rotatably supported by the bracket 631.

The bracket 631 is fixed to the rear wall 22 of the first passenger carriage 2 and pivotally supports the pulley 632. The bracket 631 includes, for example, a pair of metal plates facing each other in the vertical direction and a shaft section connecting the pair of metal plates to each other. Through the center of the pulley 632, the shaft section extends, and thereby, the pulley 632 is freely rotatably attached to the first passenger carriage 2.

Here, as illustrated in FIG. 5A, when the articulated vehicle travelling straightly turns, for example, left as illustrated in FIG. 5B, the rear wall 22 of the first passenger carriage 2 tilts with respect to the travelling direction of the second passenger carriage 3 centering the center in the right-and-left direction as indicated by the imaginary line in FIG. 4. Then, a left-side-end space between the first passenger carriage 2 and the second passenger carriage 3 narrows whereas a right-side-end space between the first passenger carriage 2 and the second passenger carriage 3 widens. Along with this, the support 63 at the left side on the first passenger carriage 2 approaches the second passenger carriage 3 along the rope 621, and the support 63 at the right side on the first passenger carriage 2 moves along the rope 621 in a direction away from the second passenger carriage 3. At this time, the rope 621 is maintained in a state where certain tension is applied, and therefore, the weight of the rope 621 can prevent the rope 621 from warping. Moreover, since the rope 621 is made of a non-stretchable material, warp can be reduced even when force is applied to a part of the rope 621 between the first passenger carriage 2 and the second passenger carriage 3 along the right-and-left direction.

As described above, the first entry preventive body 51 of the present embodiment can maintain the tension of the rope 621 when the first passenger carriage 2 turns left or right with respect to the second passenger carriage 3 running straightly as well as in a state where the first passenger carriage 2 and the second passenger carriage 3 travel straightly. Note that, thereafter, as the first passenger carriage 2 travels, the travelling direction of the second passenger carriage 3 parallelly approximates to the travelling direction of the first passenger carriage 2, but each support moves along the rope 621 in accordance with the movement of the second passenger carriage 3, thereby maintaining the tension of the rope 621.

Next, the second entry preventive body 52 will be described. The structure of the second entry preventive body 52 is substantially the same as the structure of the first entry preventive body 51 but is different in the following points. That is, as illustrated in FIG. 3, the second entry preventive body 52 is different in that a pair of anchors 61 is fixed to the rear wall 22 of the first passenger carriage 2, and a pair of supports 63 is fixed to the front wall 31 of the second passenger carriage 3. Moreover, the pair of supports 63 is located at a higher level than the pair of anchors 61, and the pair of anchors 61 and the pair of supports 63 are thus offset from each other in the vertical direction. Thus, a rope 621 installed between the pair of anchors 61 and the pair of supports 63 tilt such that the height of the rope 621 increases backward.

Similarly to the first entry preventive body 51, the second entry preventive body 52 can maintain the tension of the rope 621 when the first passenger carriage 2 turns left or right with respect to the second passenger carriage 3 running straightly as well as when the first passenger carriage 2 and the second passenger carriage 3 travel straightly.

Next, the third entry preventive body 53 will be described. The structure of the third entry preventive body 53 is substantially the same as the structure of the first entry preventive body 51 but is different in the following points. That is, a pair of supports 63 fixed to the rear wall 22 of the first passenger carriage 2 are located at a higher level than a pair of anchors 61 fixed to the front wall 31 of the second passenger carriage 3, and the pair of anchors 61 and the pair of supports 63 are thus offset from each other in the vertical direction. Thus, a rope 621 installed between the pair of anchors 61 and the pair of supports 63 tilt such that the height of the rope 621 decreases backward.

Thus, in the articulated vehicle of the present embodiment, the second entry preventive body 52 and the third entry preventive body 53 lie across (cross) each other when viewed in the right-and-left direction. Thus, the ropes 621 can be installed in a large area with the number of ropes 621 as small as possible, and it is possible to prevent a person from entering a space between the first passenger carriage 2 and the second passenger carriage 3 in the large area.

The fourth entry preventive body 54 is disposed below the first entry preventive body 51 to be parallel to the first entry preventive body 51. The other configurations of the fourth entry preventive body 54 are the same as those of the first entry preventive body 51, and the description thereof is thus omitted.

The bar-like member 5 having such a configuration is disposed between the first passenger carriage 2 and the second passenger carriage 3 as described above, and additionally, between the tractor 1 and the first passenger carriage 2. Thus, as illustrated in FIG. 5, also when the tractor 1 in linear movement turns, the tension of the rope 621 can be maintained in each of the bar-like member 5 disposed between the tractor 1 and the first passenger carriage 2 and the bar-like member 5 disposed between the first passenger carriage 2 and the second passenger carriage 3.

Moreover, the connecting structure for the articulated vehicle of the present embodiment includes a tension imparting unit. The tension imparting unit imparts tension to the rope 621. The tension imparting unit of the present embodiment includes a spring 64.

As illustrated in FIG. 4, the spring 64 is disposed in a part in the length direction of the rope 621. The spring 64 has a spring constant higher than or equal to a certain value. The spring 64 stretched to a certain extent is installed in the rope 621. Thus, both ends of the ropes 621 are urged to a center side in a longitudinal direction of the rope.

The spring constant of the spring 64 is preferably, for example, higher than or equal to 1.7 N/mm. Specifically, for example, a connection spring (AK3788) manufactured by Asano Metal Industry Co., Ltd. is illustrated. This prevents the rope 621 from being stretched even when certain external force is applied to the rope 621 in a direction crossing the length direction of the rope 621.

Thus, the connecting structure for the articulated vehicle of the present embodiment includes the tension imparting unit and thus enables tension to be imparted to the rope 621 even when the rope 621 is stretched out after a long time period. Therefore, the tension of the rope 621 can be maintained.

Moreover, when the spring 64 is provided on the way in the longitudinal direction of the rope 621, it is possible to prevent the rope 621 from being broken even in case of application of excessive tension to the rope 621 when the articulated vehicle turns left or right.

Effects

As described above, the connecting structure for the articulated vehicle of the present embodiment is a connecting structure for an articulated vehicle including the first vehicle and the second vehicle connected via the coupler 4 along a travelling direction the articulated vehicle. The structure includes the pair of anchors 61, the connecting cord 62, and the pair of supports 63. The pair of anchors 61 is disposed at an end of the first vehicle so as to be on both sides of the coupler 4 in a direction perpendicular to the travelling direction in plan view, the end facing the second vehicle. The pair of supports 63 is disposed at an end of the second vehicle so as to be on both sides of the coupler 4 in the direction perpendicular to the travelling direction in plan view, the end facing the first vehicle. The connecting cord 62 has both ends connected to the pair of anchors 61 with an intermediate portion of the connecting cord 62 being supported by the pair of supports 63. The pair of supports 63 supports the connecting cord 62 in a manner allowing for movement of the connecting cord 62. Here, in the present embodiment, when the tractor 1 is a first vehicle, the first passenger carriage 2 corresponds to the second vehicle. Alternatively, when the first passenger carriage 2 is the first vehicle, the second passenger carriage 3 or the tractor 1 corresponds to the second passenger carriage 3. Alternatively, when the second passenger carriage 3 is the first vehicle, the first passenger carriage 2 corresponds to the second passenger carriage 3.

This configuration enables the tension of the connecting cord 62 to continuously be maintained also when the first vehicle and the second vehicle tilt with respect to each other in plan view while the first vehicle and the second vehicle run. Thus, a person can be prevented from approaching the coupler 4 by mechanical action in the articulated vehicle including a plurality of vehicles connected to each other, while warping and drooping down of the connecting cord 62 are reduced, when the articulated vehicle turns left or right.

Moreover, the connecting structure for the articulated vehicle of the present embodiment includes the following additional structures. That is, each of the pair of supports 63 of the present embodiment includes the pulley 632 supporting the connecting cord 62. This configuration enables the support 63 to move more smoothly with respect to the connecting cord 62 and to prevent tension from being excessively applied to the connecting cord 62 when the articulated vehicle turns left or right.

Moreover, the connecting structure for the articulated vehicle of the present embodiment includes the following additional structure. That is, the entry preventive bodies 51 to 54 each includes the pair of anchors 61, the connecting cord 62, and the pair of supports 63 of the present embodiment, wherein the entry preventive bodies 51 to 54 are disposed in the vertical direction. This configuration can more securely prevent a person from entering a space between the first vehicle and the second vehicle.

Moreover, the connecting structure for the articulated vehicle of the present embodiment includes the following additional structure. That is, the pair of anchors 61 and the pair of supports 63 in the at least one entry preventive body of the present embodiment are disposed with an offset from each other in the vertical direction. With this configuration, entry of a person can be prevented in a much larger area with a small number of connecting cords 62.

Moreover, the connecting structure for the articulated vehicle of the present embodiment includes the following additional structure. That is, the connecting structure for the articulated vehicle of the present embodiment further includes a tension imparting unit configured to impart tension to the connecting cord 62. With this configuration, even when the connecting cord 62 is stretched out along with the deterioration of the connecting cord 62, it is possible to impart tension to the connecting cord 62, and thus it is possible to maintain the tension of the connecting cord 62 for a long time period.

(First Variation)

The articulated vehicle of the first embodiment may be in an aspect as shown in, for example, FIGS. 6 to 11 (this aspect is referred to as a first variation). Note that in the present variation, components corresponding to those in the first embodiment are denoted by the same reference signs as those in the first embodiment with "a" at the end, components different from those in the first embodiment are denoted by reference signs newly with "a" at the end, and redundant description is omitted.

Similarly to the first embodiment, a plurality of bar-like members 5a of the present embodiment are provided between a tractor 1a and a first passenger carriage 2a and between the first passenger carriage 2a and a second passenger carriage 3a. Each bar-like member 5a includes a plurality of entry preventive bodies 51a to 53a. Connecting cords 62a of the plurality of entry preventive bodies 51a to 53a extend in the forward-and-rearward direction such that the entry preventive bodies 51a to 53a are parallel to each other in the vertical direction.

Figure 7:
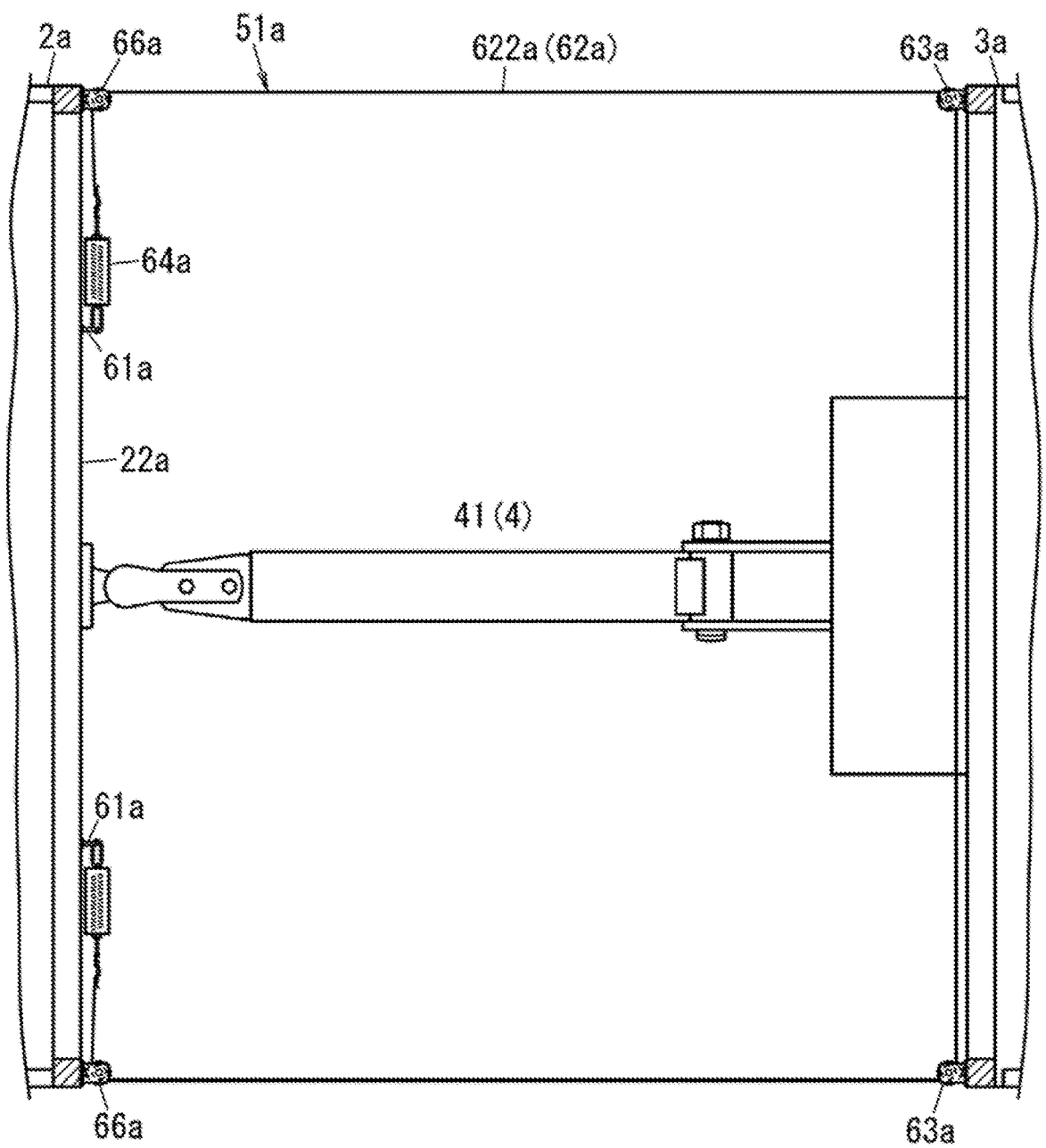
FIG. 7 is a plan view illustrating a part between a first passenger carriage and a second passenger carriage of the articulated vehicle of the first variation.

FIG. 7 shows the entry preventive bodies 51a to 53a between the first passenger carriage 2a and the second passenger carriage 3a. The plurality of entry preventive bodies 51a to 53a all have the same structures, and thus, the entry preventive body 51a (first entry preventive body) at the uppermost level will be described.

The entry preventive body 51a includes a pair of anchors 61a fixed to a rear wall 22a of the first passenger carriage 2a, a pair of second supports 66a fixed to the rear wall 22a on a side located further outward with respect to the pair of anchors 61a, a pair of supports (hereinafter, first supports 63a) fixed to a front wall 31 of the second passenger carriage 3a, and the connecting cord 62a. The pair of anchors 61a, the pair of second supports 66a, and the pair of first supports 63a are disposed at the same level in the vertical direction (i.e., at the same height location).

The pair of anchors 61a is fixed to the rear wall 22a of the first passenger carriage 2a, on a further inner side than the ends of the rear wall in the right-and-left direction. The pair of anchors 61a is fixed to a part located on the center side by about ¼ of the overall length of the rear wall 22a in the right-and-left direction for example, from the ends of the rear wall 22a in the right-and-left direction. Thus, each anchor 61a is apart from a corresponding one of the second supports 66a by a certain dimension.

Figure 8:
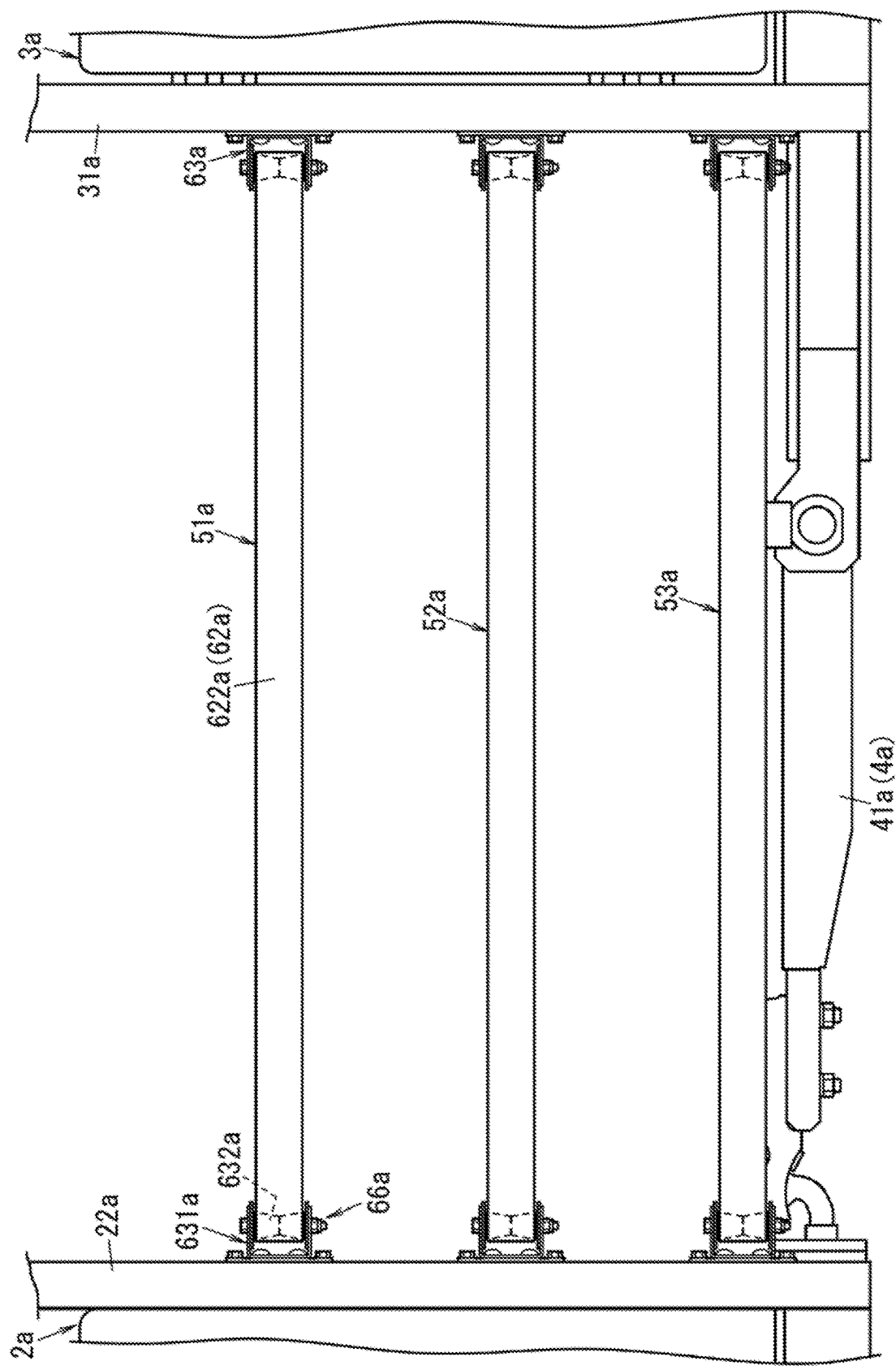
FIG. 8 is a side view illustrating the part between the first passenger carriage and the second passenger carriage of the articulated vehicle of the first variation.

The pair of second supports 66a is fixed to the ends of the rear wall 22a in the right-and-left direction. As illustrated in FIG. 8, each second support 66a includes a bracket 631a and a pulley 632a freely rotatably supported by the bracket 631a.

The bracket 631a pivotally supports the pulley 632a. The bracket 631a is fixed to the rear wall 22a of the first passenger carriage 2a. The bracket 631a includes a pair of metal plates facing each other in the vertical direction and a shaft section connecting the pair of metal plates to each other. The shaft section extends through the center of the pulley 632a, and thus, the pulley 632a is freely rotatably attached to the first passenger carriage 2a.

Figure 10:
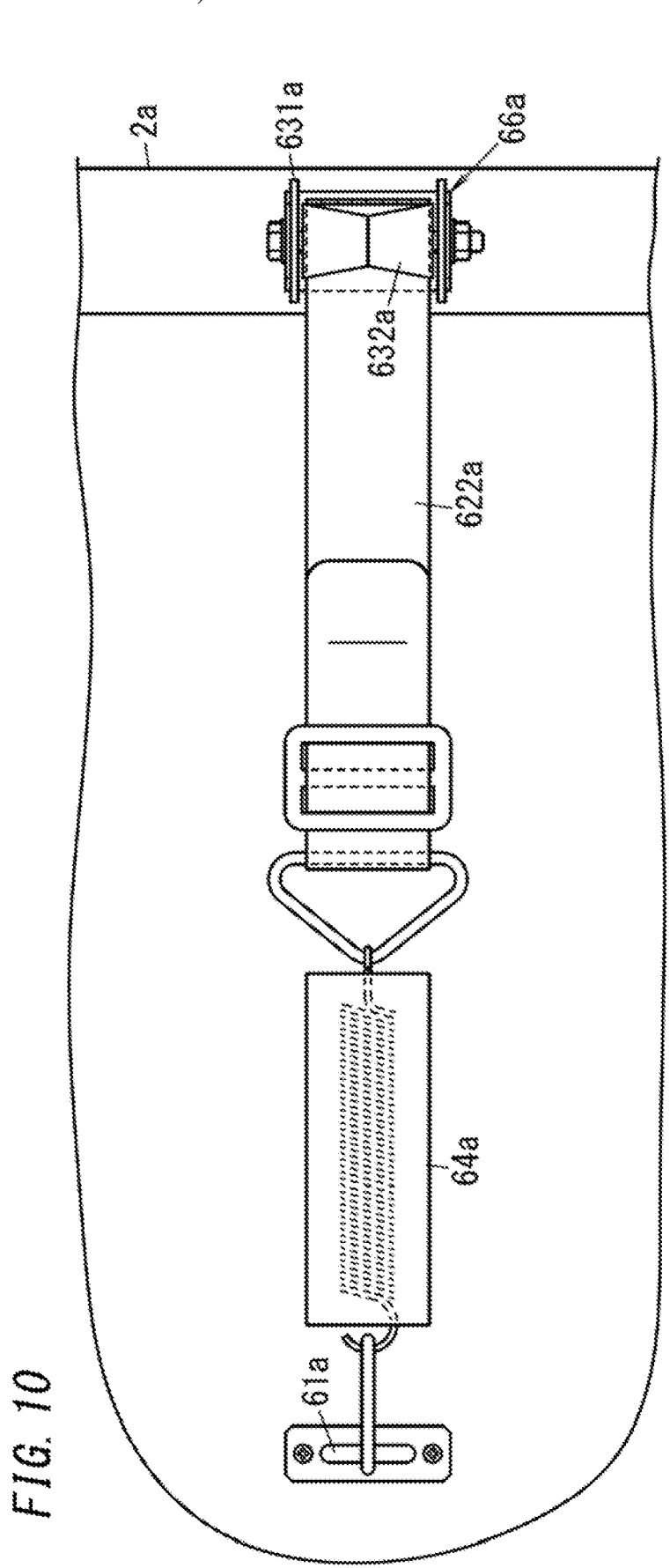
FIG. 10 is a front view of FIG. 9.

As illustrated in FIG. 10, the pulley 632a has a narrow section at the center of the shaft section in the longitudinal direction (rotation-axis direction). In other words, the pulley is symmetrically formed with the center in the longitudinal direction of the shaft section as a boarder to have a shape formed by bringing small-diameter surfaces of a pair of circular truncated cones to abut against each other. That is, the pulley 632a has a diameter which gradually decreases toward the center side in the rotation-axis direction.

As illustrated in FIG. 8, the pair of first supports 63a is fixed to the front wall 31a of the second passenger carriage 3a. The pair of first supports 63a is disposed at ends of the front wall 31a of the second passenger carriage 3a in the right-and-left direction. Each first support 63a is disposed to face a corresponding one of the second supports 66a. Note that the first support 63a has the same structure as the second support 66a, and the description thereof is omitted.

The connecting cord 62a is a belt 622a. As illustrated in FIG. 7, the belt 622a includes a pair of ends and an intermediate portion between the pair of ends. The intermediate portion is supported by the pair of second supports 66a and the pair of first supports 63a. In the intermediate portion, the second support 66a, the first support 63a, the first support 63a, and the second support 66a are aligned in this order along the length direction of the intermediate portion. The pair of ends is connected to the pair of anchors 61a via springs 64a on a one-to-one basis. Similarly to the first embodiment, the belt 622a has flexibility. The belt 622a is made of, for example, nylon and does not stretch at a tension lower than or equal to a certain value.

Figure 9:
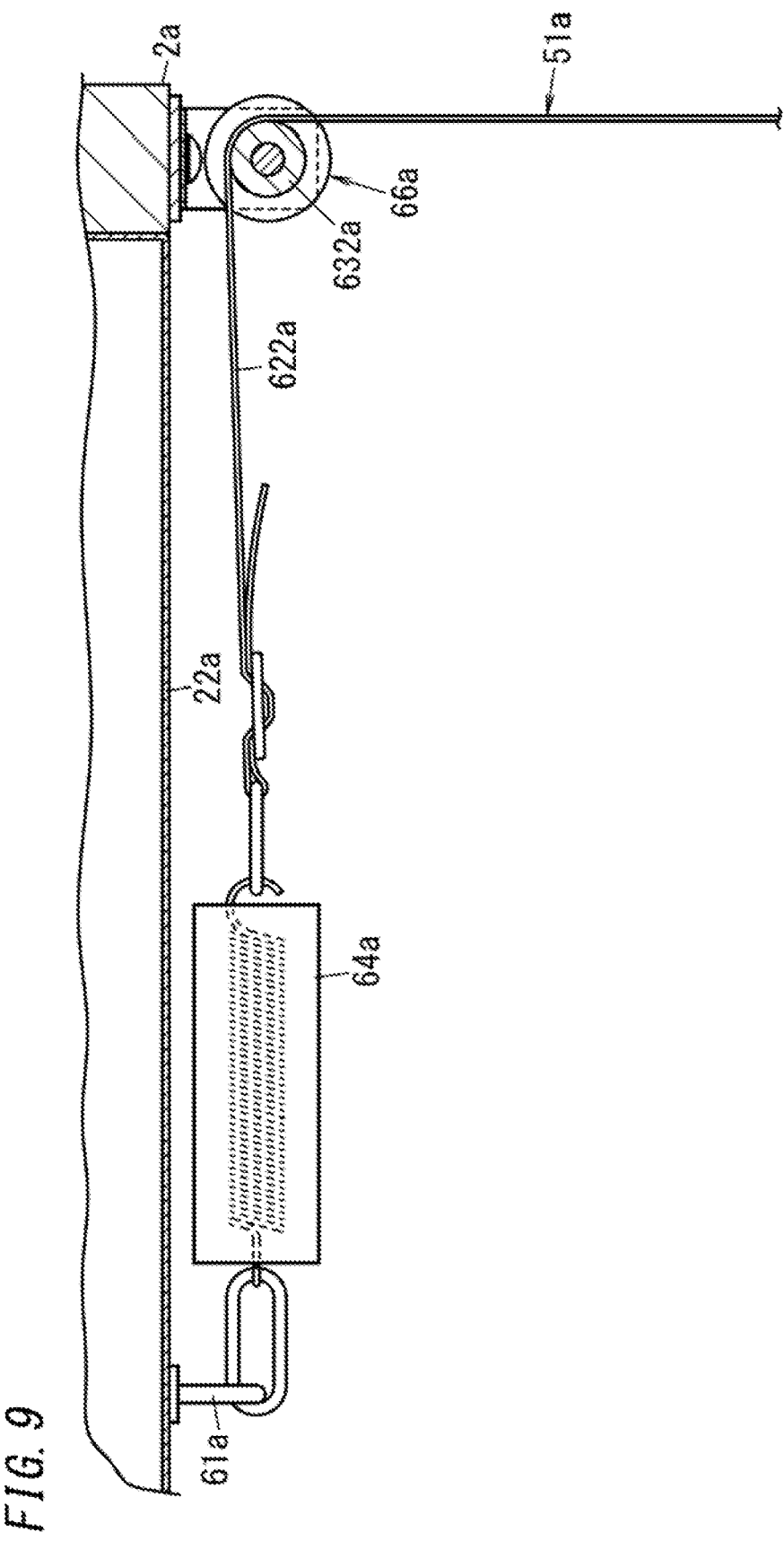
FIG. 9 is a horizontal sectional view illustrating an anchor and a vicinity of a first support of the articulated vehicle of the first variation.

Each spring 64a serves as a tension imparting unit. The spring 64a is provided at each of both ends in the length direction of the belt 622a. As illustrated in FIGS. 9 and 10, the longitudinal direction of the spring 64a is arranged to be parallel to the longitudinal direction of the belt 622a. The spring 64a has, in the longitudinal direction, one end connected to the anchor 61a, and the other end connected to the belt 622a.

The spring 64a is provided at each of both ends in the longitudinal direction of the belt 622a. Each spring 64a stretched to a certain extent is connected to the belt 622a, and in an attached state, each spring 64a constantly impart a certain tension to the belt 622a. Thus, also when the first passenger carriage 2a and the second passenger carriage 3a travel in a linear travelling direction or turns left or right, it is possible to maintain the tension applied to the belt 622a.

The entry preventive body 51a having such a configuration includes a plurality of entry preventive bodies 51a arranged in the vertical direction. The plurality of belts 622a arranged in the vertical direction are parallel in the horizontal direction and parallel to each other.

As described above, in the connecting structure for the articulated vehicle of the first variation, the connecting cord 62a includes the belt 622a. The pulley 632a has a diameter which decreases toward a center side in a rotation-axis direction. With this configuration, even when the belt 622a is displaced to a side away from the center side in the rotation-axis direction of the pulley 632a, the pulley 632a rotates, thereby returning the belt 622a to the center side in the rotation-axis direction.

Moreover, in the articulated vehicle of the first variation, each of the pair of springs 64a is disposed between a corresponding one of the anchors 61a and a corresponding one of the second supports 66a. Thus, even when the space between the first vehicle and the second vehicle decreases when the articulated vehicle turns left or right, it is possible to prevent the spring 64a from interfering the first support 63a or the second support 66a.

(Second Variation)

Figure 11:
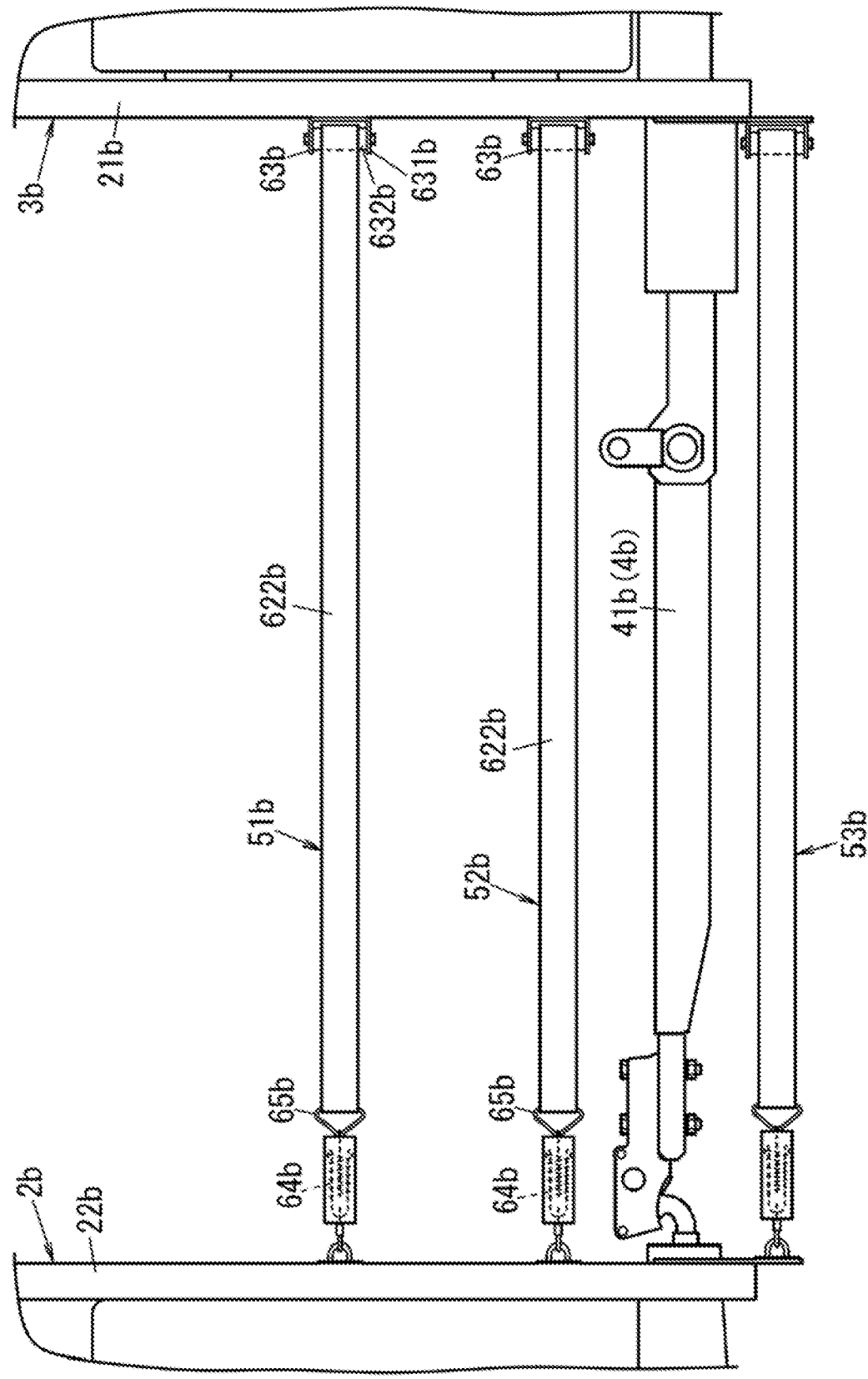
FIG. 11 is a side view illustrating a part between a first passenger carriage and a second passenger carriage of an articulated vehicle of a second variation of the first embodiment of the present invention.

The tension imparting unit of the first embodiment is provided between both ends of a connecting cord 62b, more specifically, between a pair of ends of a rope 621 included in the connecting cord 62b but may have an aspect as shown in, for example, FIG. 11 (this aspect is referred to as a second variation). Note that in the present variation, components corresponding to those in the first embodiment are denoted by the same reference signs as those in the first embodiment with "b" at the end, components different from those in the first embodiment are denoted by reference signs newly with "b" at the end, and redundant description is omitted.

The connecting cord 62b of the second variation includes a belt 622b. The belt 622b is made of, for example, nylon and does not stretch at a tension lower than or equal to a certain value.

The tension imparting unit of the second variation includes a pair of springs 64b. Each spring 64b is connected between each end of the belt 622*b* and a first passenger carriage 2*b*. Each spring 64*b* is the same as that in the first embodiment.

Each spring 64*b* has one end fixed by being hooked over the first passenger carriage 2*b* and the other end fixed to the belt 622*b* via a connection metal piece 65*b*. As illustrated in FIG. 11, the connection metal piece 65*b* is formed by bending a wire and has an isosceles triangle shape having a base side and a pair of equal sides. The connection metal piece 65*b* has a portion corresponding to the base side and fixed to the belt 622*b*, and an apex side of portions corresponding to a pair of equal sides is connected to the spring 64*b*.

The spring 64*b* is provided at each of both ends in the longitudinal direction of the belt 622*b*. Each spring 64*b* stretched to a certain extent is connected to the belt 622*b*, and in an attached state, each spring 64*b* constantly impart a certain tension to the belt 622*b*. Thus, also when the first passenger carriage 2*b* and a second passenger carriage 3*b* travel in a linear travelling direction or turns left or right, it is possible to maintain the tension applied to the belt 622*b*.

Entry preventive bodies 51*b* to 53*b* having such configuration are arranged in the vertical direction also in the second variation. The entry preventive bodies 51*b* to 53*b* are parallel to each other.

Note that similarly to the first embodiment, the tension imparting unit in the first variation and the tension imparting unit in the second variation may be fixed to the second passenger carriage 3*a* and 3*b* respectively or may be fixed to the tractor 1*a* and 1*b* respectively. That is, in the present invention, the tension imparting unit is disposed at least one of the first vehicle and the second vehicle.

Second Embodiment

Figure 12:
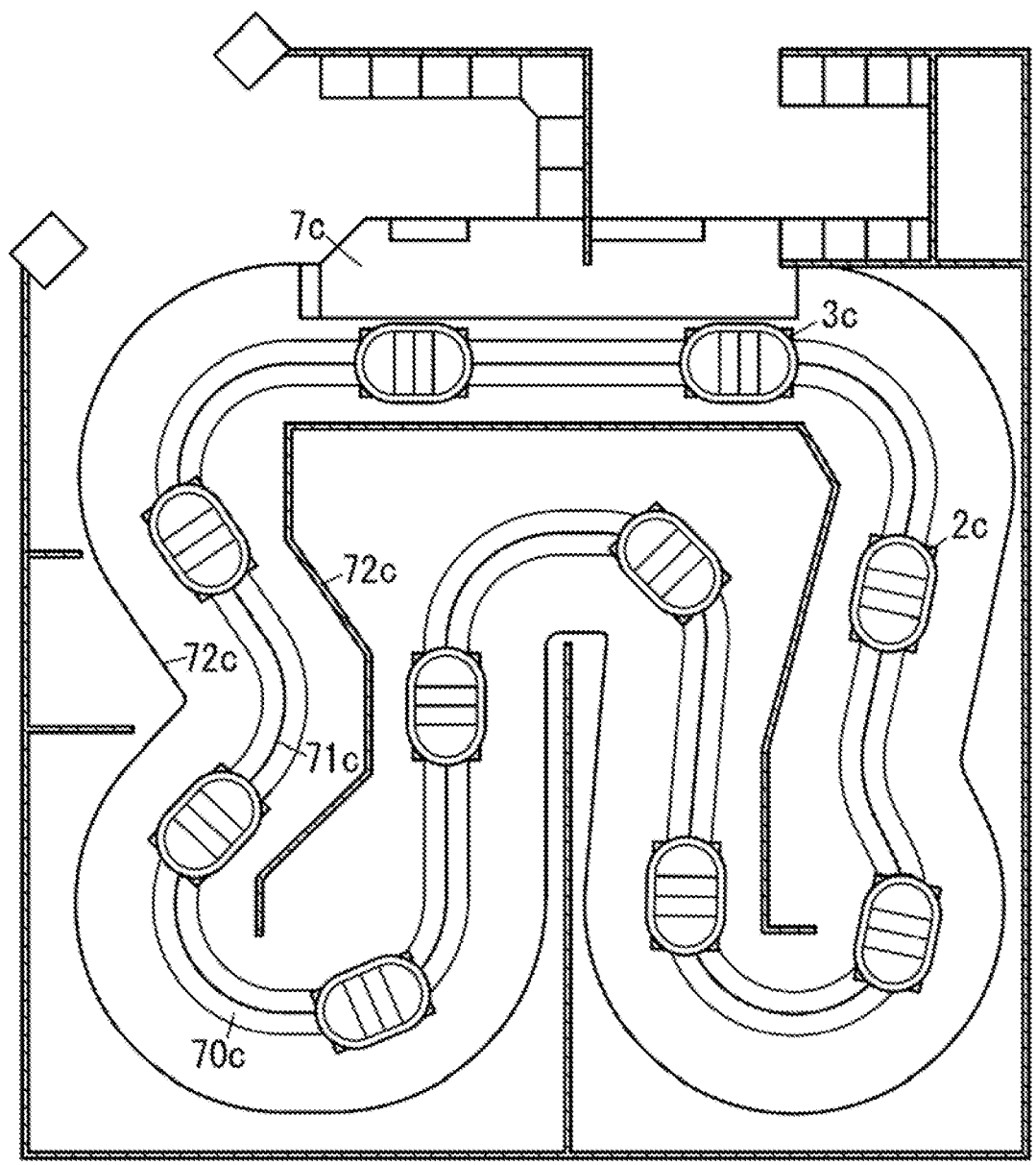
FIG. 12 is an overview schematically illustrating a show set in which an articulated vehicle of a second embodiment of the present invention runs.

Next, with reference to FIG. 12, a second embodiment will be described. Note that most components of the present embodiment are the same as those in the first embodiment, and therefore, the same reference signs are used to denote the same components, and the description thereof is omitted, and components different from those in the first embodiment will be mainly described. Note that in the present embodiment, components corresponding to those in the first embodiment are denoted by the same reference signs as those in the first embodiment with "c" at the end, components different from those in the first embodiment are denoted by reference signs newly with "c" at the end, and redundant description is omitted.

The articulated vehicle of the second embodiment is an indoor ride for loading passengers to let the passengers view a show set 72*c* installed indoors. As illustrated in FIG. 12, a railway 70*c* is disposed indoors, and the articulated vehicle of the present embodiment moves along the railway 70*c*.

As illustrated in FIG. 13, the articulated vehicle of the present embodiment includes a drive rail 71*c* disposed along the railway 70*c*, a plurality of passenger carriages 2*c* and 3*c* fixed to the drive rail 71*c*, and a plurality of bar-like members 5*c* provided between the passenger carriages 2*c* and 3*c*. Each of the passenger carriages 2*c* and 3*c* is configured to load passengers from a platform 7*c*, circulate along the railway 70*c*, and then, allow the passengers to disembark at the platform 7*c*.

The drive rail 71*c* extends along the railway 70*c* and is endlessly (annularly) continuous. The drive rail 71*c* is configured to move along the railway 70. A drive source of the drive rail 71*c* is, for example, a motor.

The plurality of passenger carriages 2*c* and 3*c* are arranged along the longitudinal direction of the drive rail 71*c* with a predetermined interval therebetween (in the present embodiment, a passenger carriage in the front in the travelling direction is the first passenger carriage 2*c*, and a passenger carriage behind the first passenger carriage 2*c* is the second passenger carriage 3*c*). The passenger carriages 2*c* and 3*c* include roller supports 24*c* and 34*c* mounted on a floor surface and connectors 23*c* and 33*c* mechanically connected to the drive rail 71*c*.

The plurality of passenger carriages 2*c* and 3*c* are connected to each other via the drive rail 71*c*. The plurality of passenger carriages 1*c*, 3*c* . . . are configured to move along the drive rail 71*c* when the drive rail 71*c* moves in the longitudinal direction. Thus, in the present embodiment, the drive rail 71*c* corresponds to the coupler 4*c*.

Each bar-like member 5*c* includes a plurality of entry preventive bodies 51*c* and 52*c*. Each of the entry preventive body 51*c* and 52*c* is formed along a horizontal surface. The plurality of entry preventive bodies 51*c* and 52*c* are located at a higher level than the platform 7*c*. Note that the configuration of each of the entry preventive bodies 51*c* and 52*c* is the same as that in the first embodiment, and the description thereof is omitted.

The articulated vehicle of the present embodiment can maintain the tension of a rope 621*c* even when the drive rail 71*c* moves in the travelling direction and the passenger carriages 2*c* and 3*c* tilt relative to each other in the right-and-left direction. Thus, according to the articulated vehicle of the present embodiment, a person can be prevented from approaching the coupler 4*c* through mechanical action while warping and drooping down of the connecting cord 62*c* are reduced. As a result, a passenger can be prevented from entering a space between the first passenger carriage 2*c* and the second passenger carriage 3*c* from the platform 7*c*.

Moreover, the articulated vehicle of the second embodiment may also accordingly be provided with a tension imparting unit.

(Application)

The pair of supports 63, 63*a*, 63*b*, 63*c* of the first and second embodiments include the pulleys 632, 632*a*, 632*b*, but as long as the connecting cord 62, 62*a*, 62*b*, 62*c* can be movably supported, the pulleys 632, 632*a*, 632*b* may be omitted. That is, for example, in place of the pulleys 632, 632*a*, 632*b*, a round bar having an arc-shaped peripheral surface may be provided, and the connecting cord 62, 62*a*, 62*b*, 62*c* may be hung along the peripheral surface so as to be freely slidably supported. Here, a low-friction coefficient material is preferably used for the connecting cord 62, 62*a*, 62*b*, 62*c*.

Any of a pair of anchors 61, 61*a*, 61*b*, 61*c* and a pair of support 63, 63*a*, 63*b*, 63*c* may be disposed at the front in the travelling direction. That is, in the present invention, any of the first vehicle and the second vehicle may be disposed at the front in the travelling direction.

The tension imparting unit includes the springs 64, 64*a*, 64*b*, 64*c* but may include an elasticity body such as rubber.

The invention claimed is:

1. A connecting structure for an articulated vehicle including a first vehicle and a second vehicle connected to each other via a coupler along a travelling direction of the articulated vehicle, the connecting structure comprising:
 a pair of anchors disposed at an end of the first vehicle so as to be on both sides of the coupler in a direction perpendicular to the travelling direction in plan view, the end facing the second vehicle;

a pair of supports disposed at an end of the second vehicle so as to be on both sides of the coupler in the direction perpendicular to the travelling direction in plan view, the end facing the first vehicle;

a connecting cord having flexibility and having both ends connected to the pair of anchors with an intermediate portion of the connecting cord being supported by the pair of supports, and a plurality of entry preventive bodies each including the pair of anchors, the connecting cord, and the pair of support, the pair of supports supporting the connecting cord in a manner allowing for movement of the connecting cord, and wherein the plurality of entry preventive bodies are disposed in a vertical direction.

2. The connecting structure for the articulated vehicle according to claim 1, wherein each of the pair of supports includes a pulley which supports the connecting cord.

3. The connecting structure for the articulated vehicle according to claim 2, wherein the connecting cord includes a belt, and the pulley has a diameter which decreases toward a center side in a rotation-axis direction.

4. The connecting structure for the articulated vehicle according to claim 1, wherein the pair of anchors and the pair of supports included in at least one entry preventive body of the plurality of entry preventive bodies are disposed with an offset from each other in the vertical direction.

5. The connecting structure for the articulated vehicle according to claim 1, further comprising a tension imparting unit configured to impart tension to the connecting cord.

6. A connecting structure for an articulated vehicle including a first vehicle and a second vehicle connected to each other via a coupler along a travelling direction of the articulated vehicle, the connecting structure comprising:

a pair of anchors disposed at an end of the first vehicle so as to be on both sides of the coupler in a direction perpendicular to the travelling direction in plan view, the end facing the second vehicle;

a pair of supports disposed at an end of the second vehicle so as to be on both sides of the coupler in the direction, perpendicular to the travelling direction in plan view, the end facing the first vehicle;

a connecting cord having flexibility and having both ends connected to the pair of anchors with an intermediate portion of the connecting cord being supported by the pair of supports, and a tension imparting unit configured to impart tension to the connecting cord, the pair of supports supporting the connecting cord in a manner allowing for movement of the connecting cord, wherein the tension imparting unit includes a pair of springs each of which is disposed at a corresponding one of both ends of the connecting cord.

7. The connecting structure for the articulated vehicle according to claim 6, comprising:

a pair of first supports as the pair of supports; and a pair of second supports disposed at the end of the first vehicle which faces the second vehicle, each of the pair of second supports being apart from a corresponding one of the pair of anchors, wherein the connecting cord is supported by the pair of second supports and the pair of first supports, and each of the pair of springs is disposed between a corresponding one of the pair of second supports and a corresponding one of the pair of anchors.

* * * * *